F. LAIST AND J. O. ELTON.
PROCESS OF EXTRACTING ZINC FROM ORES.
APPLICATION FILED JAN. 5, 1920.
1,362,166.
Patented Dec. 14, 1920.
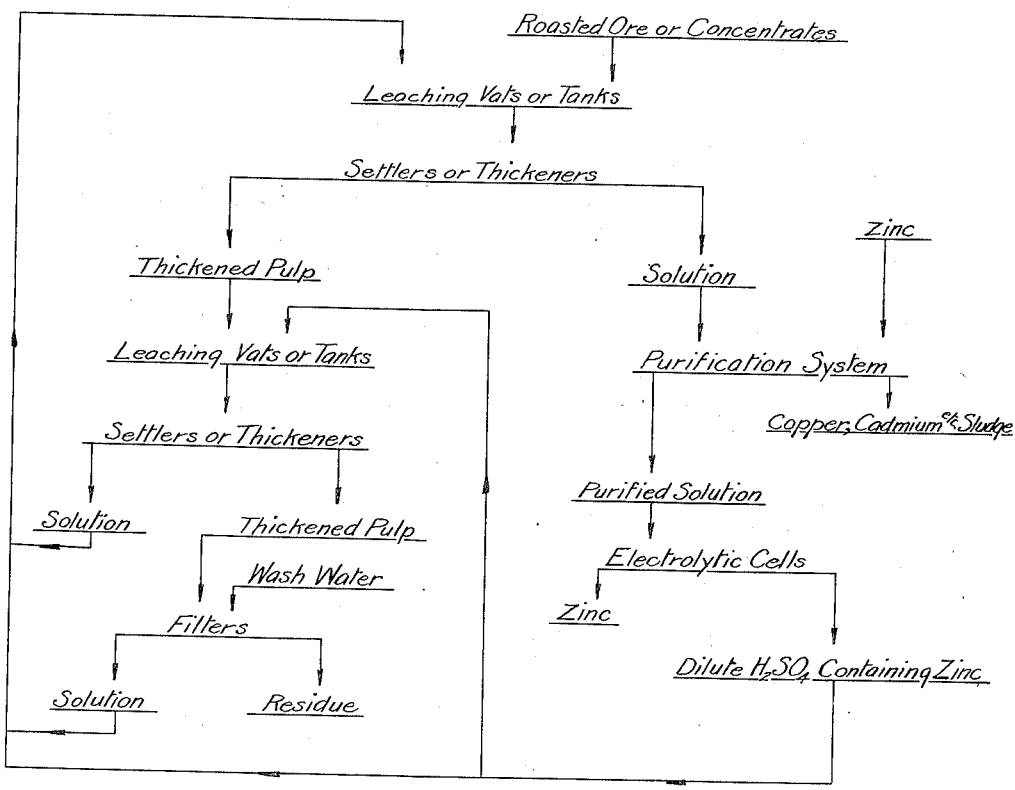

UNITED STATES PATENT OFFICE.

FREDERICK LAIST, OF ANACONDA, AND JAMES ORR ELTON, OF GREAT FALLS, MONTANA, ASSIGNORS TO ANACONDA COPPER MINING COMPANY, OF ANACONDA, MONTANA, A CORPORATION OF MONTANA.

PROCESS OF EXTRACTING ZINC FROM ORES.

1,362,166.     Specification of Letters Patent.     Patented Dec. 14, 1920.

Application filed January 5, 1920. Serial No. 349,575.

*To all whom it may concern:*

Be it known that we, (1) FREDERICK LAIST and (2) JAMES ORR ELTON, citizens of the United States, residing at (1) Anaconda, (2) Great Falls, in the counties of (1) Deerlodge, (2) Cascade, and State of Montana, have invented certain new and useful Improvements in Processes of Extracting Zinc from Ores, of which the following is a specification.

The object of this invention is the provision of a cyclical process by which zinc may be economically extracted from ores in which it exists in association with other metals such as lead, iron, copper, silver, gold, etc.

For the proper performance of the cycle the zinc should be present in the ore as oxid, or as a mixture of oxid and sulfate, with as little sulfid as possible, the oxidation of sulfid ores being preferably accomplished by roasting. Although any unroasted sulfid may be recovered by flotation of the leached residue, nevertheless it is desirable for the purposes of this invention to convert as great a proportion as possible of the sulfid into oxid in the original roast.

The roasted ore or concentrate is treated with dilute sulfuric acid, the ore or concentrate being in quantity sufficient not only to neutralize all of the acid, but also to insure the precipitation of iron, arsenic, antimony, etc. Provision is made in accordance with the usual practice for the oxidation of the iron dissolved in the leach, as well as of any ferrous iron that may have been added to the leach or to the leaching solution prior to the leaching operation.

It is a well recognized fact that in a leach of the above character, where the gangue material of the ore contains silica in forms soluble in dilute sulfuric acid, a certain amount of silica will pass into solution and will remain in solution after neutralization, unless a sufficient excess of base, such as calcium carbonate or zinc oxid, is added to insure its removal. When the silica is removed by means of calcium carbonate, filtration of the resulting residue is usually slow, and moreover the moisture content of the residue is high, making it desirable to dehydrate this residue in order to granulate the precipitated silica before the final leaching and filtration.

According to the present invention, an excess of zinc oxid is added, either in the form of roasted ore or pure zinc oxid, under conditions to precipitate the soluble silica in such form that it is practically insoluble in a second treatment with dilute acid, and moreover does not interfere seriously with the filtration. The amount of oxid or roasted ore necessary to be used is determined by complete coagulation of the leach, as indicated by rapid settling after neutralization. Heat aids the reaction and reduces the quantity of zinc oxid required.

The neutral solution resulting from this leach is partly separated from the residue by settling, or by settling and filtration, and is sent to a purification system to be freed from the remaining impurities, such as copper, cadmium, etc., by the usual methods; and is later electrolyzed with lead or other insoluble anodes for the production of metallic zinc and the regeneration of dilute sulfuric acid. The dilute acid so regenerated is used again as the leaching solution, thereby completing the cycle.

The residue with the entrained solution derived from the neutral leach described above is treated with sufficient dilute sulfuric acid to dissolve all the material which is readily soluble in weak acid, and to provide sufficient acid in excess to insure the presence of acid in contact with the residue up to the time of its final separation from the solution. After a sufficient period of agitation this acid pulp is sent to settlers and filters, or other suitable equipment for the separation of the residue and dilute acid solution. The residue so obtained is practically freed from soluble zinc by washing with water or dilute acid or both, and is then discarded in so far as the present process is concerned. The resulting solution, containing a small proportion of acid, is returned to the ore-leaching operation, where it becomes mixed with that portion of the returned solution from the electrolytic cells that is used in the primary or neutral leach.

In the leach of the residue from the primary leaching a certain amount of iron which has been precipitated in the primary leach is re-dissolved and is held in solution as ferric sulfate, and as compounds of iron with arsenic, antimony and other impurities. In the titration of this iron-bearing solution for acid, using methyl orange as an indicator, ferric sulfate acts similarly to an acid, so that when the acid reaction disappears, the ferric sulfate is found to be completely precipitated. Therefore, instead of having free sulfuric acid present, the titration may be made with ferric sulfate solution alone, and as the apparent acid content is reduced ferric salts are precipitated and pass into the residue. If there is insufficient soluble iron present in the original ore to precipitate completely from solution all of the arsenic and antimony dissolved in the original leach, a certain amount of iron can be returned from the second leach to the first leach by merely increasing the (apparent) acid content of the final solution from the second leach. This is readily accomplished by diverting a greater portion of the acid solution from the electrolytic cells to the second leach. This procedure affords an easy method of controlling the iron content of the leaching solution, and effects a saving in the amount of iron necessary to be added in order to eliminate the arsenic and antimony content of the solution. Thereby we are able to conserve the soluble iron content of an ore containing a low per cent. of iron and small amounts of arsenic, antimony, etc. If too much iron is being returned from the second leach to the primary leach, this is readily corrected by reducing the (apparent) acid content of the second leach, thereby precipitating a portion of the iron.

The amount of arsenic and antimony redissolved in the second leach seems to be roughly proportional to the volume of solution handled through that leach. It is advisable, therefore, in general practice, to put as much solution through the first leach and as little through the second leach as possible, while so controlling and adjusting the distribution of the solutions as to obtain the desired results. In practical operation, as a general rule, we prefer to apply approximately four-fifths of the total acid solution to the first leach, the balance being applied to the secondary leach; obviously, however, these proportions will vary according to the particular ore treated.

The accompanying drawing is a diagrammatic flow sheet of the process in its preferred embodiment, illustrating the distribution of the acid liquor to the primary and secondary leaching operations.

Among the advantages of the process, the following may be mentioned:

(1.) The elimination of limestone, milk of lime, or other foreign material commonly employed for the neutralization of the primary leach;

(2.) The elimination of drying and dehydrating, or of filtering and drying, the primary residue before the secondary leach;

(3.) Control of the iron content of the leaching solution in the primary leach by controlling the (apparent) acidity of the second leach;

(4.) The production of a final residue which is easily filtered, low in moisture, and low in the amount of undissolved zinc soluble in dilute sulfuric acid;

(5.) Removal of the bulk of the solution before the secondary leach affords increased settling capacity in the equipment for the acid leach settling system, or renders possible the reduction of this equipment;

(6.) The temperature of the neutral leach is kept at a maximum by the rapid addition of all the roasted ore to the acid solution, the heat of reaction maintaining the temperature of the leach, and thereby promoting settling;

(7.) The large bulk of the residue from the neutral leach materially aids in settling the precipitated iron, silica, etc. in the neutral settlers;

(8.) The precipitation of a portion of the copper in the neutral solution by the excess zinc oxid in the roasted ore renders possible the cheap removal of copper from the second leach; and (9.) The pulp is thickened and rendered suitable for subsequent flotation, following the second leach, if it is desired to recover in this manner any remaining zinc sulfid.

We claim:—

1. A cyclical process of extracting zinc from its ores, comprising leaching the ore with dilute sulfuric acid in quantity insufficient for complete extraction of the zinc; purifying the resulting zinc sulfate solution and electrolyzing the same with insoluble anodes to produce metallic zinc and a dilute acid solution; returning a portion of said acid solution to the primary ore-leaching operation; and applying another portion thereof to leaching the residue from the primary leaching operation.

2. A cyclical process of extracting zinc from its ores, comprising leaching the ore with dilute sulfuric acid in quantity insufficient for complete extraction of the zinc; purifying the resulting zinc sulfate solution and electrolyzing the same with insoluble anodes to produce metallic zinc and a dilute acid solution; returning a portion of said acid solution to the primary ore-leaching operation; applying another portion thereof to leaching the residue from the primary leaching operation; and returning the resulting zinc-bearing solution to the primary leaching operation.

3. In a process of extracting zinc from its ores, the steps comprising leaching the ore with dilute sulfuric acid in quantity insufficient for complete extraction of the zinc, separating the resulting zinc sulfate solution from the zinc-bearing residue and subjecting said residue to a secondary leaching operation with dilute sulfuric acid.

4. In a process of extracting zinc from its ores, the steps comprising leaching the ore with dilute sulfuric acid in quantity insufficient for complete extraction of the zinc, separating the resulting zinc sulfate solution from the zinc-bearing residue, subjecting said residue to a secondary leaching operation with dilute sulfuric acid, and returning the resulting zinc-bearing solution to the primary leaching operation.

In testimony whereof we affix our signatures.

FREDERICK LAIST.
JAMES ORR ELTON.